United States Patent [19]

Bujese et al.

[11] 4,229,096

[45] Oct. 21, 1980

[54] COUNTDOWN AND START MECHANISM FOR AN ELECTROSTATIC COPIER

[75] Inventors: David P. Bujese, Toms River, N.J.; George P. Rahgo, Stratford, Conn.

[73] Assignee: Pitney Bowes Inc., Stamford, Conn.

[21] Appl. No.: 973,214

[22] Filed: Dec. 26, 1978

[51] Int. Cl.[3] .................... G03G 15/00; G06F 15/18; G06M 1/00

[52] U.S. Cl. .................... 355/14 CU; 235/91 R; 235/132 R

[58] Field of Search ................ 355/3 R, 14 R, 14 CU; 235/91 R, 132 R, 132 A

[56] References Cited

U.S. PATENT DOCUMENTS

| | | | |
|---|---|---|---|
| Re. 29,274 | 6/1977 | Collette et al. | 355/14 CU X |
| 3,125,291 | 3/1964 | Komatar | 235/132 R |
| 3,634,637 | 1/1972 | Suzuki et al. | 355/14 CU X |

*Primary Examiner*—Fred L. Braun
*Attorney, Agent, or Firm*—Peter Vrahotes; William D. Soltow, Jr.; Albert W. Scribner

[57] ABSTRACT

A countdown and start mechanism for a cyclically operable machine wherein an escapement mechanism is adapted for the countdown control. An escape wheel is provided to concentrically carry a cycle counter knob for indicating the number of cycles to be performed. An anchor is actuated once during each cycle of the machine to incrementally step the escape wheel down toward a null position whereupon the machine is stopped. A start mechanism is provided to actuate the machine after the counter knob is set for a given number of operations or for a single cycle when no setting is made.

18 Claims, 11 Drawing Figures

Fig. 9
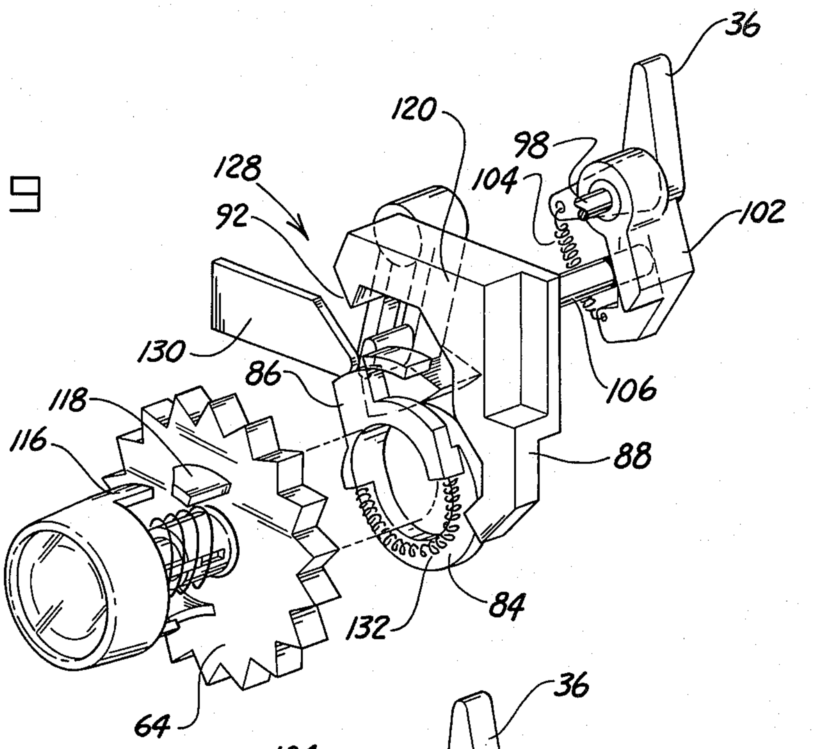
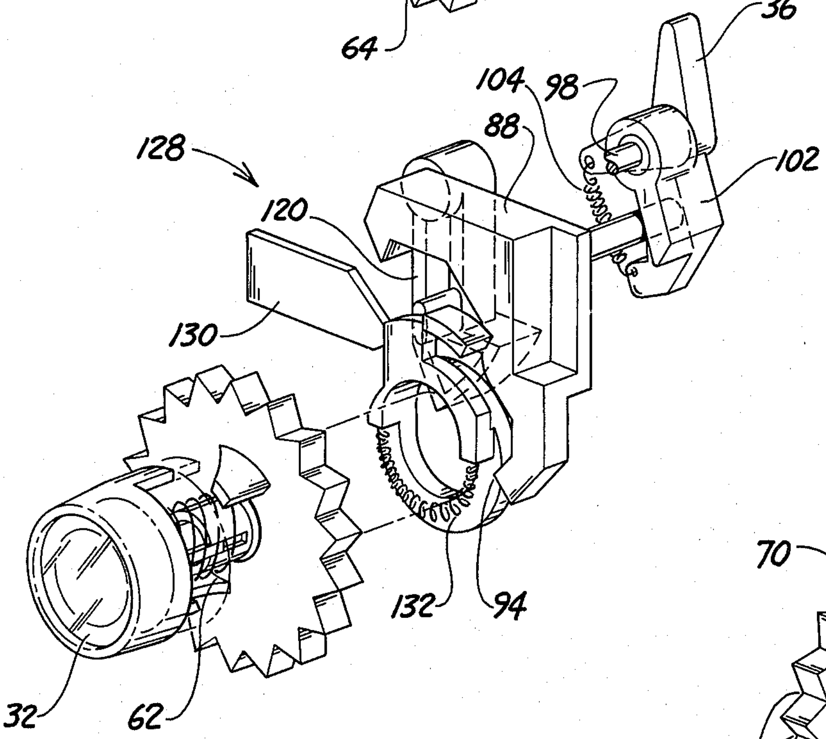
Fig. 10
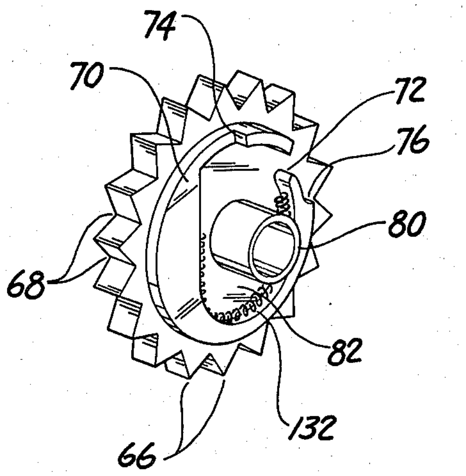
Fig. 11

COUNTDOWN AND START MECHANISM FOR AN ELECTROSTATIC COPIER

BACKGROUND OF THE INVENTION

This invention relates to a control for an electrophotographic copying machine, and in particular a countdown control mechanism.

Electrophotocopy machines have gone through a number of evolutions since their first appearance. Presently, one of the more popular types of machines is generally denominated as a low volume, moderately priced, convenience-type copier. Such machines are characterized by their relatively small appearance and their ease of operation. Characteristically, they include a minimum number of controls, require little or no operator training, and have an overall simplicity of construction and operation, at least as compared to their predecessors.

Copy machines as well as many other types of repetitive cyclically operable machines are controlled by counter or countdown devices. Such devices operate the machine to make either one or multiple copies of a given document. Accordingly, it would be desirable to have a countdown device which is compatible in its simplicity and operation with the present day convenience-type copier.

There are numerous mechanical, electrical, and electromechanical devices which have been designed to control the cyclical operation of copy machines. One typical mechanical device is a pawl and ratchet arrangement whereby the pawl is periodically operated, once for each copy, in order to step down the ratchet that has been pre-set to a position corresponding to a predetermined number of copies. Examples of such relatively simple pawl and ratchet type countdown devices can be found in U.S. Pat. Nos. 3,600,085; 3,634,637; 3,756,711; 4,027,965 and 3,834,814. Other devices make use of multiple pawls or ratchets or both in order to provide a countdown mechanism, as exemplified in U.S. Pat. Nos. 3,863,052 and U.S. Pat. No. 29,274 Re. Still other pawl and ratchet type devices have optional settings which will enable an operator to continuously make a predetermined number of copies of different documents without the necessity of resetting the counter mechanism after each set of copies is made. Still other mechanical countdown devices use a slider type of mechanism with a linear scale for showing the number of copies demanding to be made. See, for example, U.S. Pat. Nos. 3,900,256 and 3,916,167.

In addition to the foregoing mechanical devices, there are a number of electrical and combined electromechanical countdown mechanisms. For examples of the latter, see U.S. Pat. Nos. 3,445,160, 3,482,912, 3,503,677 and 3,758,755.

Nevertheless, despite the many combinations and variations, of countdown devices shown by the prior art, there remains a need for a simple, effective countdown mechanism that is compatible in cost, construction, and operation with the now popular convenience-type copiers.

In the art of timekeeping one of the best known mechanisms to measure time is an escapement, comprising the combination of an escape wheel and an anchor. In pendulum time pieces, a weight is attached to the spindle of a toothed, escape wheel thus causing the wheel to rotate. That rotation, however, is arrested by the anchor which is linked to the pendulum. Under the control of the pendulum, the anchor periodically engages and releases the toothed wheel. Each time the pendulum reaches its maximum amplitude one of the projections (pallets) of the anchor releases a tooth of the escape wheel, allowing the wheel to rotate a corresponding amount. Its rotation therefore is formed in a series of incremental movements that are controlled by the anchor and pendulum. It is that rotation that is transmitted to the hands of the clock through a train of gear wheels. In other time pieces, such as watches, the controlling action of the pendulum is performed by a device called a balance wheel. Attached to the spindle of the balance wheel is a spiral spring named the balance spring or hair spring, which controls the oscillations of the balance. The pallets of the anchor are attached to the balance through a linkage such that with each oscillation of the lever the pallets release an escape wheel allowing it to rotate a distance corresponding to each tooth. The driving force of the escape keywheel is supplied by the wound, main spring of the watch.

SUMMARY OF THE INVENTION

In its broader aspects, this invention contemplates the adaptation of an escapement mechanism to a countdown control for a cyclically operable machine. The escape wheel is adapted to concentrically carry a cycle counter knob for indicating the number of cycles yet to be performed. The anchor is periodically actuated once during each cycle of the machine to incrementally step the escape wheel down toward a null position whereupon the machine is stopped.

More particularly, the invention contemplates a countdown control mechanism for operating a machine for a selected number of cycles. The invention further contemplates that the controlled machine may be a copy machine or any other machine which performs cyclical operations. The machine has a start switch that is transferable between first and second (open) positions. The start switch is normally biased toward the second (open) position and is electrically connected to a control circuit of the machine. The control circuit will continuously operate the machine when the start switch is transferred to the first (closed) position. When the start switch transfers to the second (open) position, the machine stops.

Means is provided for transferring the stop switch from its biased second position to the first position in order to start the operation of the machine. A releasable latch maintains the start switch in the first position to insure the continuous operation of the machine for a selected number of cycles.

A toothed escape wheel has a plurality of angular settings including a null setting. The escape wheel is turnable to any one of its plurality of settings, each of which corresponds to a different selected number of cycles of operation of the machine. There is a start switch latch release which is operable by the escape wheel when the escape wheel is in its null position, thereby stopping the machine. An anchor is operable for incrementally returning the escape wheel one angular increment at a time toward the null setting of the escape wheel. The anchor is periodically operated by the machine once during each cycle of operation. Hence, as the machine performs its repetitive cycles the anchor operates to step down the escape wheel until the escape wheel is returned to its null setting. When the escape wheel reaches its null setting, the latch release is acted upon to release the start switch latch. Upon release of the latch, the start switch transfers to its second position and the machine stops.

Since the machine is started and stopped by a single switch, it is possible that an operator might attempt to manually return the escape wheel to its null position while the machine was in the middle of a cycle of its operation. Such an occurance would be undesirable, especially in copy machines, since a copy sheet could become jammed inside the machine if the full copy cycle is not completed.

To prevent premature termination in mid-cycle, the invention further provides for an escape wheel catch. The catch includes a first member that is fixedly mounted on the chassis of the machine and a second movable member which is biased toward the fixed first member and mounted on the escape wheel. The second, movable member is so positioned on the escape wheel to abut against the first fixed member when the escape wheel is displaced one angular setting from its null setting. Hence, an operator could originally set the countdown mechanism to any of the available settings, but, at most, he could only manually return it to the first setting past the null setting. The movable catch member is appropriately positioned with respect to one of the anchors so that the anchor will displace the second movable catch member out of its abutting engagement with the fixed member and thereby permit the normal incremental final movement of the escape wheel to its null position.

Accordingly, it is an object of this invention to adapt an escapement mechanism through a countdown control for a cyclically operable machine.

It is a further object of this invention to provide a countdown mechanism which cannot be manually interrupted with in mid-cycle.

It is still another object of this invention to provide a countdown control mechanism for operating a machine a selected number of cycles.

These and other objects and features of this invention will become more apparent to those skilled in the art by reference to the following detailed description and the accompanying drawings where:

FIGS. 9 and 10 are perspective views showing portions of the countdown unit shown in FIGS. 2–4.

FIG. 11 is a perspective view of a portion of the countdown unit shown in FIGS. 2–4.

DETAILED DESCRIPTION OF THE PREFERRED EMBODIMENT

Figure 1:
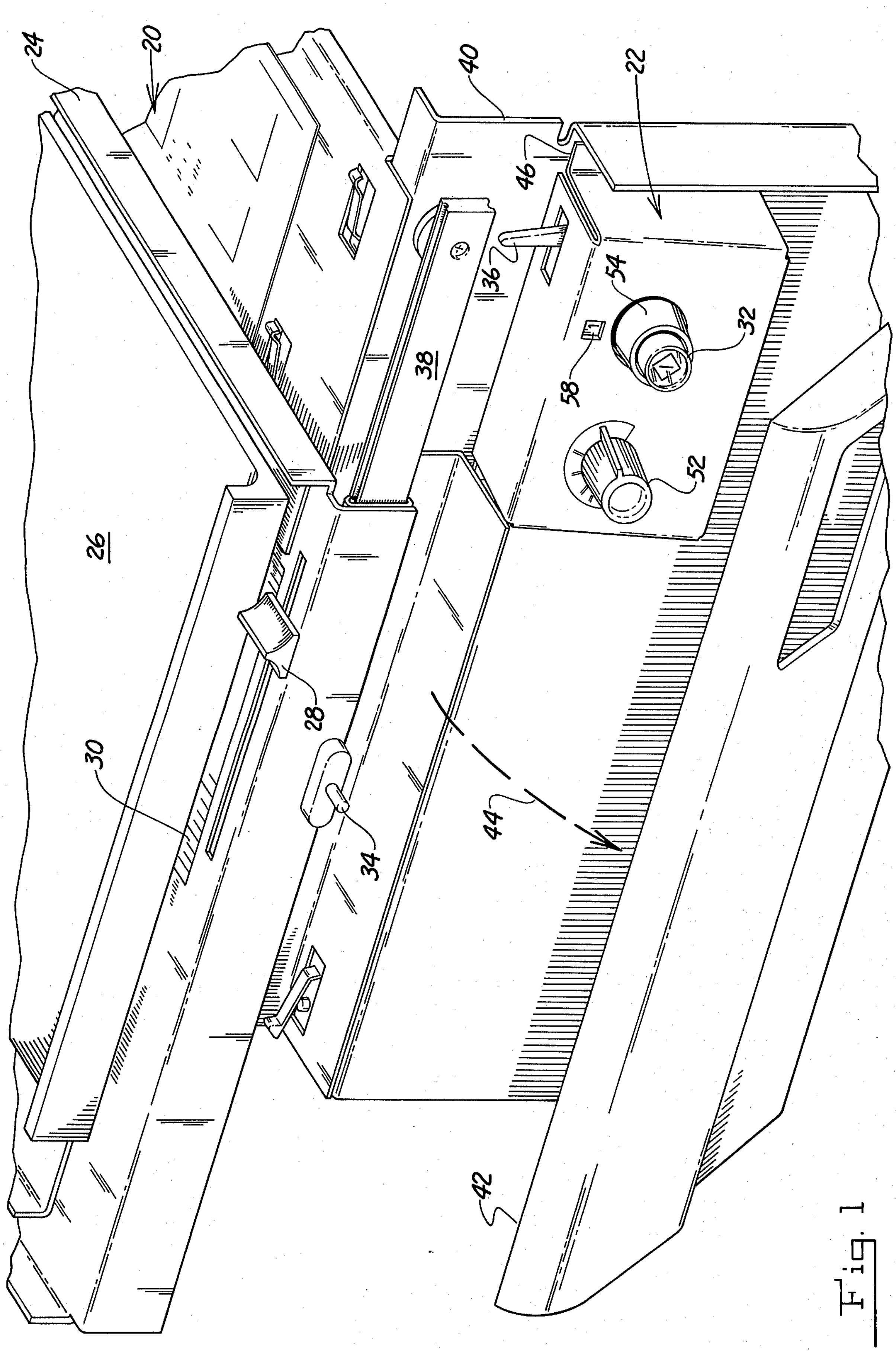
FIG. 1 is a perspective view of a copy machine including a countdown control unit constructed is accordance with the principles of this invention.

Referring now to FIG. 1 there is shown an electrophotographic copy machine generally designated by 20 which includes a countdown control mechanism generally designated at 22 which incorporates principles of the instant invention. The copy machine 20 is of similar construction to the machine described in co-pending U.S. patent applications No. 901,199, now abandoned, No. 901,203, now U.S. Pat. No. 4,148,578, No. 901,204, now U.S. Pat. No. 4,175,850, and No. 901,205, now U.S. Pat. No. 4,172,653, all filed Apr. 28, 1978, which are assigned to the assignee of this invention and are hereby incorporated by reference. The copy machine 20 has a reciprocating carriage 24 for reciprocally carrying a document across an illuminating station (not shown). A document to be copied is placed underneath an opaque cover 26 and a copy sheet length selector 28 is slidably positioned along a graduated scale 30 to correspond to the length of the desired copy sheet of the original document. Upon pressing a start button 32, the carriage translates in one direction and then returns to a home position where a trip actuator 34 engages a trip lever 36 of the countdown mechanism 22.

The carriage 24 is mounted on a pair of guide rails 38 which are in turn fixedly mounted on a frame 40. The trip actuator 34 is mounted on the side of the carriage 24. A cover 42 is hinged to the bottom of the frame 40 and is rotatably movable in the direction indicated by the arrow 44 in order to expose the interior (not illustrated) of the copy machine 20.

The countdown control mechanism 22 includes two knobs that are supported by a chassis 46 which is affixed to the frame 40. The chassis 46 includes a central post 48 that has a longitudinal opening therein. One of the knobs is a contrast quality control knob 52 which is rotatably settable through one of a number of settings in order to either increase or decrease the copy contast. The other is part of the countdown mechanism 22 in the form of a graspable annular knob 54 that includes a number dial and disc member 56 that is rotatable to display in a window 58 the desired number of copies to be made. Disposed within the knob 54 is the start button 32 which has a generally cup shape. The start button 32 is keyed to the central post 48 to prevent the button from turning.

To initiate a copy cycle, the start button 32 is pressed and thereupon the carriage 24 reciprocates to make as many copies as indicated in the window 58. At the end of each carriage 24 reciprocation, the trip actuator 34 engages the carriage trip lever 36 which in turn indexes the countdown mechanism 22 to show that one less copy remains to be made. This activity continues until the last of the desired number of copies is made whereupon the machine stops.

Figure 2:
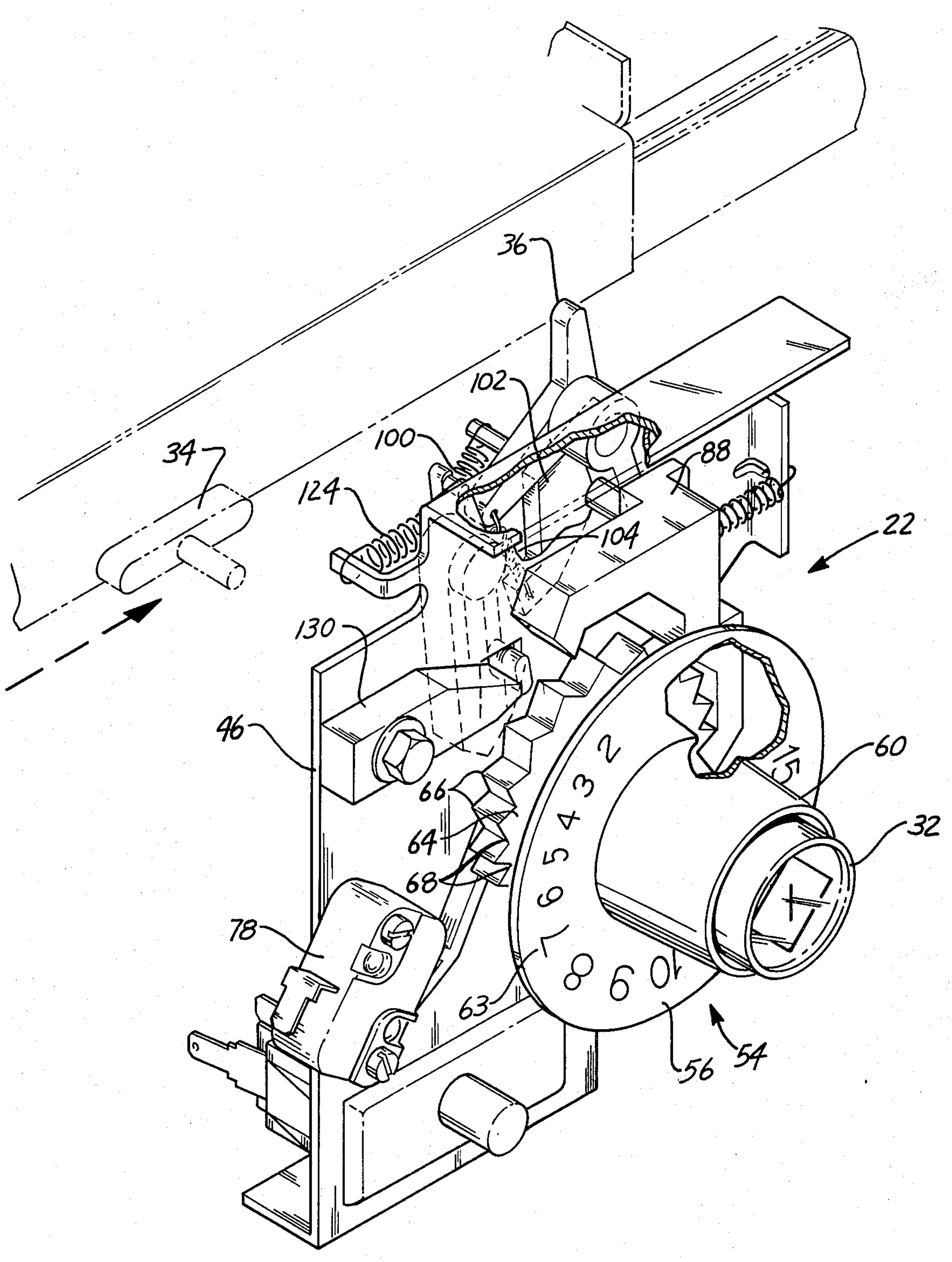
FIG. 2 is a perspective view of the countdown control unit shown in FIG. 1.
Figure 4:
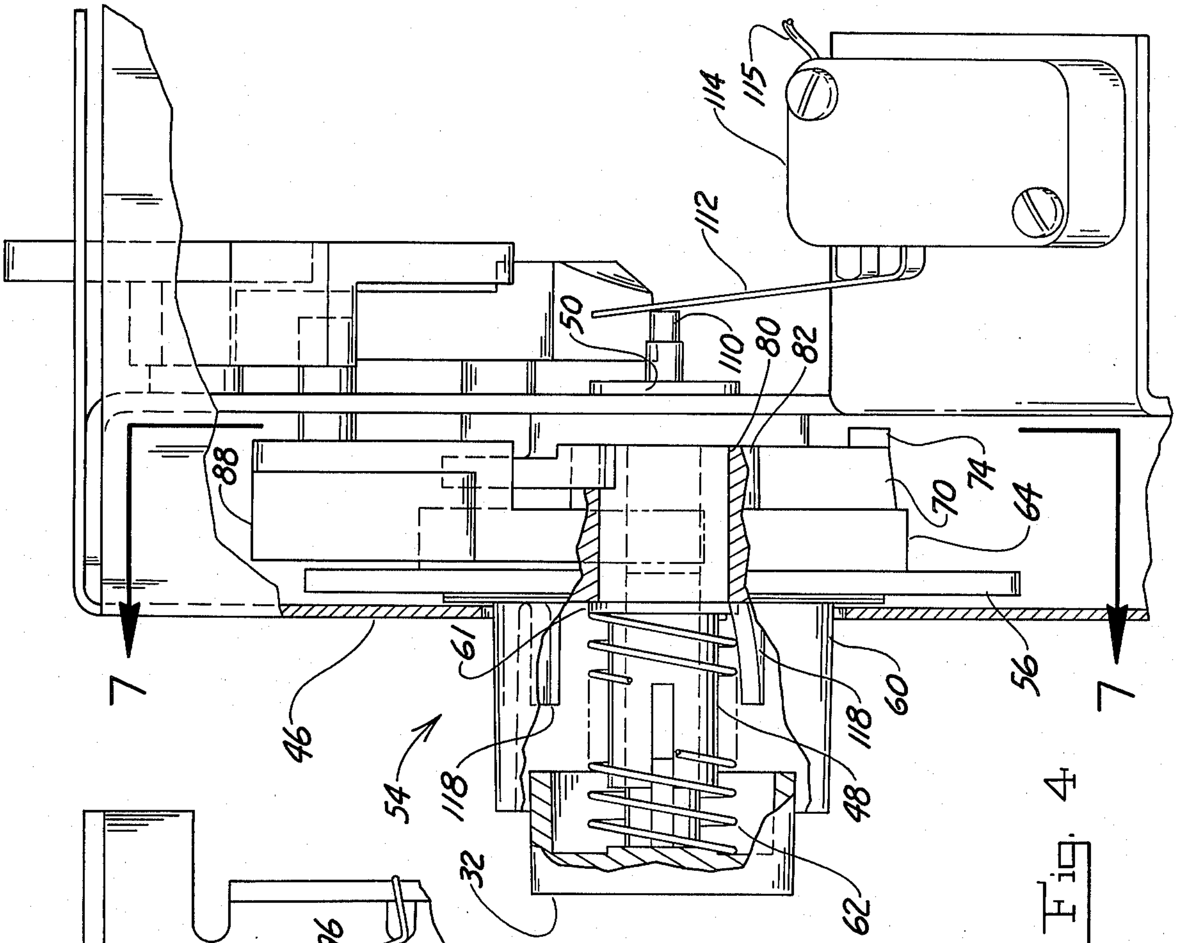
FIG. 4 is a partially cross-sectional view of the countdown unit shown in FIGS. 2 and 3.
Figure 3:
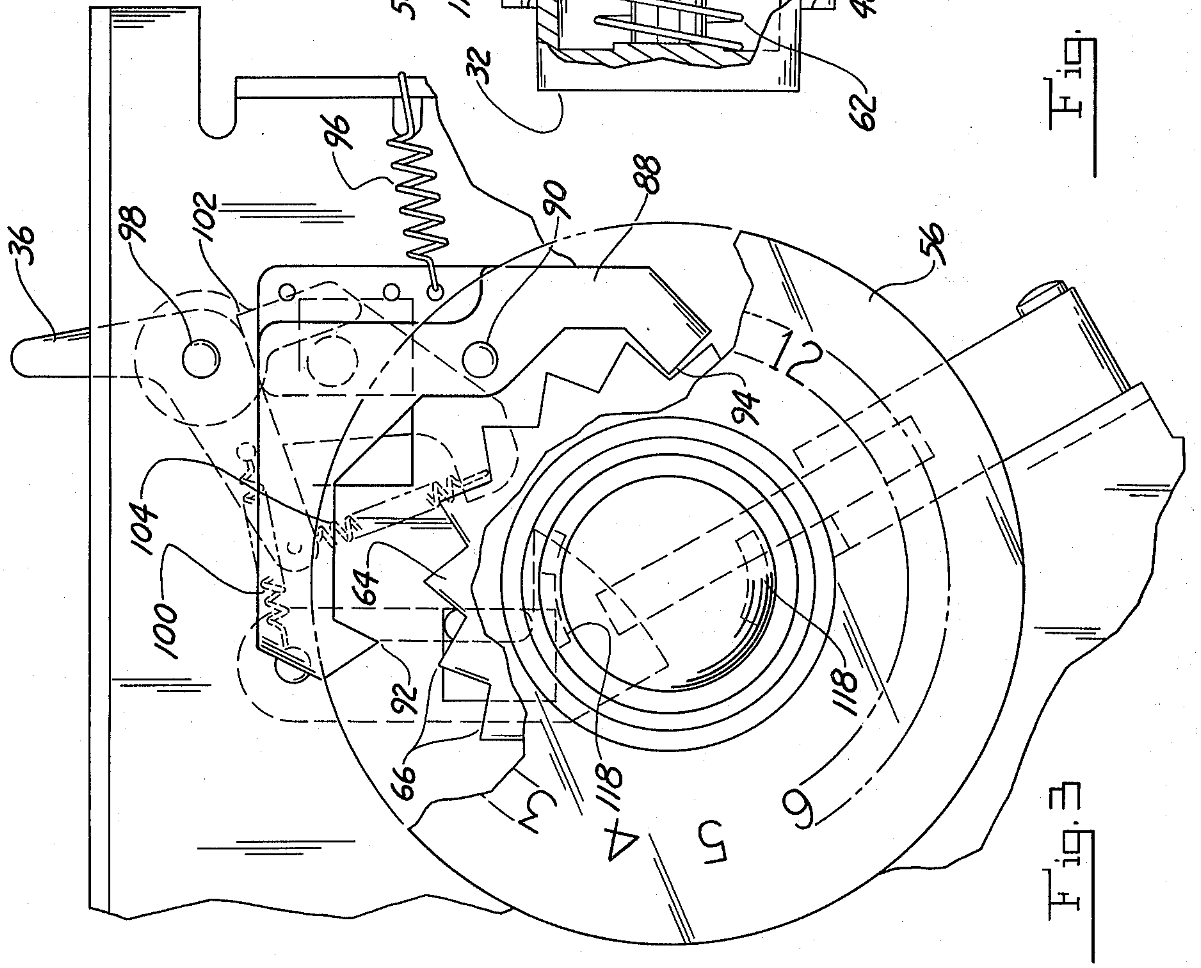
FIG. 3 is a frontal, partially broken away view of the countdown unit shown in FIG. 2.

Referring now to FIGS. 2, 3 and 4 there is shown the counter knob 54 of countdown mechanism 22. The knob 54 includes a ribbed sleeve 60 which is graspable by an operator for turning the knob. Concentrically mounted inside the sleeve 60 is the start button 32, there being a spring 62 intermediate the sleeve and the button that abuts a retaining washer 61 that is adjacent the chassis 46 and urges the start button outwardly. Integral with the perimeter of the sleeve 60 is the number dial disc member 56 which carries a plurality of indicia or numbers 63. Behind the disc member 56 and integral therewith is escape wheel 64 which includes a plurality of teeth 66 that define indentations 68 therebetween. The final portion of the knob 54 is a counter catch and release ring 70 having an opening 72 (see FIG. 11). The ring 70 has a start switch release lug 74 which projects axially therefrom. A detented portion 76 of the ring 70 operates a multi-copy switch 78 that will be explained hereinafter. The space between the central journal portion 80 of the knob 54 and the interior wall of ring 70 defines a counter catch container portion 82 for retaining a counter catch band 84 that has a lug 86 that extends through the opening 72.

Referring now to FIGS. 3, and 4, there is shown an anchor 88 which controls the movement of the escape wheel 64. The anchor 88 is mounted on the chassis 46 by a pivot pin 90 and the anchor 88 comprises two pallets 92, 94 for engaging the escape wheel 64. The anchor 88 is biased by a spring 96 that is connected to the chassis 46 so that the pallet 94 normally engages an indentation 68 in the escape wheel 64 in order to loosely restrict the motion of the escape wheel 64. The anchor 88 positions the escape wheel 64 and thereby the disc member 56 by alternately engaging first the pallet 92 and then the pallet 94 with the escape wheel. In a typical operation, the anchor will be rotated about the pivot pin 90 by the trip lever 36 upon the trip actuator 34 being reciprocated and pallet 92 will rotate toward escape wheel 64 thereby engaging a surface of one of the teeth 66. The latter engagement will urge the escape wheel 64 approximately one-half the distance away from its original setting. Then, as anchor 88 is rotated in the opposite direction by the spring 96 as the trip actuator 34 moves away from the trip lever 36, the pallet 92 moves away from escape wheel 64 and the pallet 94 will engage a surface of another tooth 66 to finally position the escape wheel 64 at a new setting which is removed one setting from the original setting. Accordingly, the anchor 88 operates on the escape wheel 64 to turn the entire knob 54 counterclockwise in step-wise angular displacements corresponding to the arcuate distance between indentations 68.

The operation of the anchor 88 is controlled by the trip lever 36 through linkage which is best shown in FIGS. 9 and 10. The trip lever 36 is a V-shaped member which is mounted on a pivot 98 at its nexus. The trip lever 36 is biased in the position shown in FIG. 3 by a spring 100. Mounted on the same pivot 98 is a trip follower 102 which is biased by a spring 104 into abutting contact with the trip lever 36, the spring 104 being mounted on the trip follower and the trip lever. An anchor lever 106 projects from the anchor, to which it is fixedly mounted, and is contacted by the trip follower 102. Accordingly, the anchor lever 106, the trip follower 102 and the trip lever 36 form a linkage for transmitting the motion of the trip actuator 34 to the anchor 88. The trip lever 36 is initially rotated clockwise by the trip actuator 34, acts on the trip follower 102 through the abutting engagement and the trip follower in turn acts on the anchor lever 106 to rotate the anchor 88 counterclockwise thereby urging the pallet 92 against the surface of the escape wheel teeth 66. As the trip actuator 34 moves away from trip lever 36, the trip lever spring 100 will return the trip lever to its original upright position along with the trip follower 102. With this action, the actuator 34 moves past the trip lever 36, releases pressure applied to the anchor 88 through the anchor lever 106 so that the anchor spring 96 acts upon the anchor to rotate the anchor clockwise about the pin 90 whereupon the pallet 94 is urged into its normal engagement with escape wheel 64 thereby completing the angular displacement of the knob 54 to a setting which is one indentation removed from its original setting.

Figure 5:
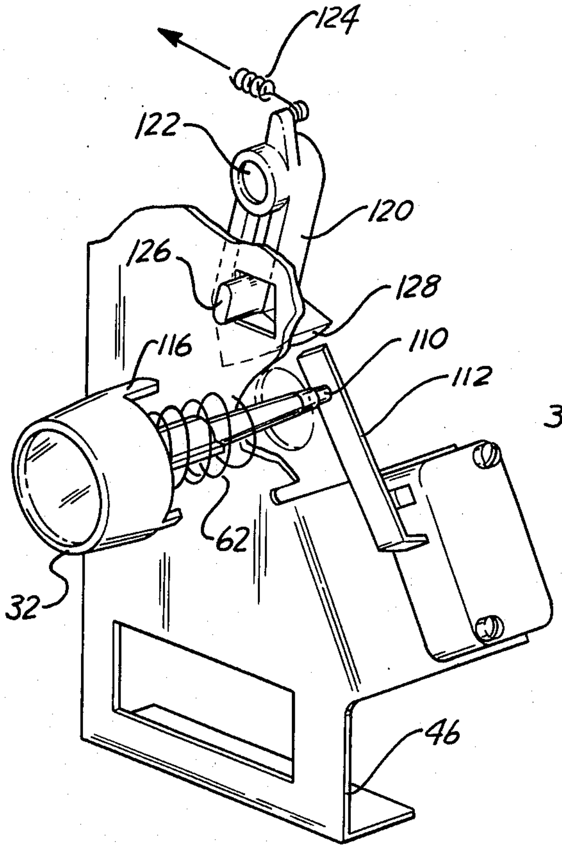
FIGS. 5 and 6 are perspective views of the start switch and start switch latch of the countdown unit shown in FIGS. 2–4.
Figure 6:
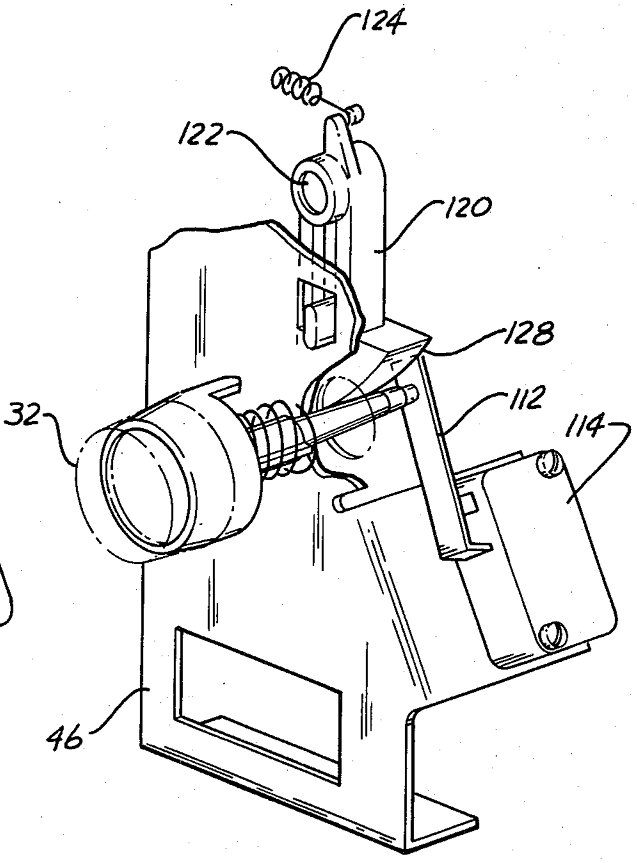

Referring now to FIGS. 5 and 6, the start button 32 is shown biased toward an operator by the spring 62 which is contained inside the ribbed sleeve 60 of the knob 54. The start button 32 is keyed to a guide post (not shown) so that it will not turn. The start button 32 is movable toward the machine and can travel a short distance, for example approximately 0.2 inches. The start button 32 has an axial finger 110 which is engageable with a switch arm 112 of a start switch 114, the start switch having an electrical lead 115 that provides electrical connection between the start switch and the copier 20. The start button 32 has a pair of single copy positioning lug 116 which is engageable with a pair of cam projections 118 which is integral with the disc member 56 of the counter knob 54 in order to urge the counter knob clockwise one setting.

Once the start button 32 is depressed, the copy machine 20 is maintained in its continuous cyclic operation by a start switch latch 120. The latch 120 is mounted on a pivot 122 to the chassis 46 and is biased by a spring 124 into an interferring relationship with the switch arm 112 of the start switch 114. A latch release tab 126 projects from latch 120 and is operated on by the release lug 74 that projects from the ring 70 of the counter knob 54 (not shown in FIGS. 5, 6). In FIG. 5 the start switch latch 120 is shown in the position in which it would be when the counter knob 54 is in its null position. In that position the release lug 74 butts against the latch tab 126 thereby causing the latch 120 to turn clockwise about its pivot 122 and out of contact with the switch arm 112 of start switch 114. In FIG. 6, the latch 120 is shown in its latch position which corresponds to any setting of the counter knob 54 other than its null setting. In this position, the release lug 74 is disengaged from the tab 126. Accordingly, the latch 120 has been rotated counterclockwise about the pivot 122 due to the biasing force of the spring 124, into a vertical position thereby placing a portion of a lower lobe 128 of the latch 120 into an interferring relationship with the switch arm 112. The switch arm 112 is flexible so that as the start button 32 is depressed the start button finger 110 forces the switch arm 112 behind the lower lobe 128 of latch 120 to its first or closed position. The switch arm 112 will be so held by the lower lobe 128 until the escape wheel 64 is returned to its null position whereupon the start switch release lug 74 will engage the tab 126 of the latch 120 to overcome the spring 124 and urge the latch 120 towards the position shown in FIG. 5, whereupon the switch arm 112 will flex to its second or off position to disable the start switch 114.

The start switch 114 is electrically connected to the control circuit of the copier 20. When the switch arm 112 of the start switch 114 is depressed, the operation of copy machine 20 begins. While the start switch 114 is latched in its first or closed position, the copy machine operates continuously thus performing its cyclic operations. With such continuous operation, the carriage will reciprocate and the anchor 88 will act upon the escape wheel 64 as previously described to move he countdown mechanism 22 one movement with completion of each copying cycle. After the desired number of cycles has been completed, the counter knob 54 will have been advanced by the escape wheel 64 to a null position whereupon the start switch 114 will be released from its closed position and the copy machine will cease operation.

While the above describes the normal operation of the copy machine 20, these remains the possibility that an operator could prematurely stop the machine in mid-cycle by returning the counter knob 54 to its null position. The latter possibility is prevented by a counter catch mechanism 128 which is operable on the knob 54 to prevent an operator from manually returning the counter knob 54 to its null position.

The aforesaid counter catch mechanism 128 is best illustrated in FIGS. 9 and 10. The mechanism includes the catch band 84, its projecting lug 86 and a fixed tab 130 that is mounted on the chassis 46 and is engageable by the lug 86. As mentioned earlier, the counter knob 54 has the counter catch and release ring 70 integral with the side of escape wheel 64. The release ring 70 movably receives the catch band 84 and its projecting catch lug 86. The lug 86 projects from the passage or opening 72 in the catch ring 70. The catch band 84 has an external, substantially circular wall which is dimensioned to be less than the internal diameter of catch ring 70 by a distance approximately equal to the projection of lug 86. The internal wall of the catch band 84 is eccentrically or eliptically configured in order to provide for translational movement of the catch lug 86 inside the catch ring 70. A biasing spring 132 urges the catch lug 86 to project outside the opening 72 in the ring 70.

Figure 7:
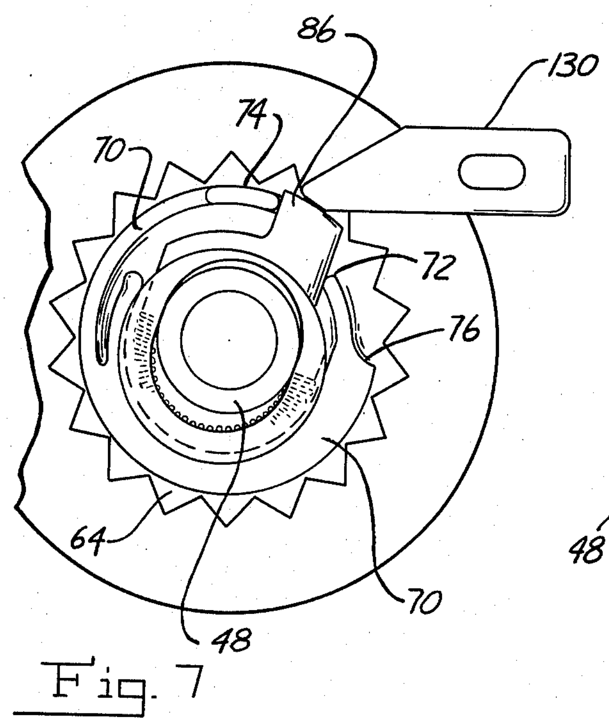
FIGS. 7 and 8 are views taken along the lines 7—7 of FIG. 4 showing portions of the control unit in two modes of operation.
Figure 8:
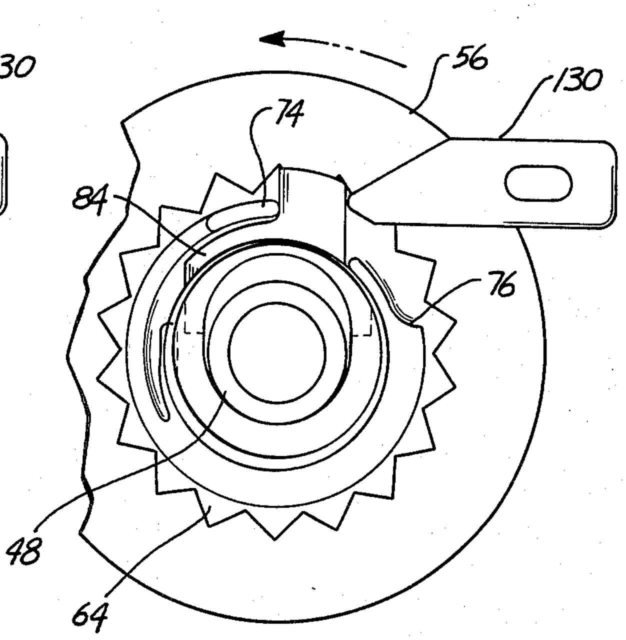

With particular reference to FIG. 7, the counter catch mechanism 128 is shown in the position that it occupies when the counter knob 54 is set to its null position. As such, it will be seen that the catch lug 86 is confined and depressed by the tab 130 that is mounted on the chassis 46. As the counter knob 54 is turned away from its null setting towards one of the multiple settings, the lug 86 is no longer confined by the tab 130 and projects above the catch ring 70. Then, as the counter knob 54 returns to its null setting, it can be seen that the lug 86 will ultimately be brought into interferring contact with the tab (FIG. 8). Of course, the counter knob 54 would be prevented from returning to its null setting unless the lug 86 were moved out of interferring relationship with the tab 130. This interferring relationship removal is provided for by the anchor 88, and in particular, the pallet 92. More particularly, the catch release ring 70 and its opening 72 are so arranged to have the lug 86 project toward pallet 92. Hence, as the anchor 88 comes down to advance escape wheel 64 towards its final or null position, the anchor also strikes the lug 86, and moves it out of interferring relationship with the tab 130, thereby permitting the escape wheel 64 and counter knob 54 to finally return to the null position.

In addition to the foregoing features, the counter knob 54 also operates a multi-copy switch 78. The functions of multi-copy switch 78 are more particularly defined in the aforementioned co-pending patent applications. Suffice it to say that in relatively small compact copy machines such as the kind hereinafter described, the speed of the machine can be increased by allowing the carriage 24 to travel a variable distance in acordance with the length of the copy sheet. However, there is a potential problem when copying especially small originals (5½") since the travel distance may be so short that the machine 20 could shut itself off before the last copy is delivered out of the machine. Hence, it is necessary to have the carriage 24 travel at least a predetermined distance during its last copy. Nevertheless, during the intermediate copies the carriage 24 may travel a shorter distance.

The multi-copy switch 78 is connected to the electrical control circuit to enable the carriage 24 to travel a variable distance, i.e., in accordance with the length of the copy sheet. The multi-copy switch 78 is actuated by the detent 76 in the ring 70. Hence, the multi-copy switch 78 transfers to its off position when the escape wheel 64 is in its setting adjacent to a null setting.

The above description has repeatedly referred to the null setting of the escape wheel 64. The null setting of the escape wheel 64 is that setting which corresponds to the setting where the start switch latch 120 is released and the counter catch lug 86 is displaced away from the tab 130. In other words, the null position is the off position for the machine 20..

The countdown control mechanism 22 always resets itself to the null setting and displays the number "1" through the window 58 when the countdown control mechanism 22 is in its null setting. It will be noted that all the other indicia on the wheel are equally spaced from each other except number "1". Indeed, all of the numbers are disposed in a corresponding relationship with one of the crests of the teeth 66 on the escape wheel 64. Thus there is one indentation 68 between each adjacent pair of numbers. However, the number "1" is different inasmuch as there are two indentations between the number "1" and the number "2". The latter is deliberately done so that prior to setting the knob 54, the number dial disc member 56 always displays the number "1" to an operator. Hence, an operator always sees that the copy machine 20 is normally set to make at least one copy. Accordingly, when a single copy is desired the operator merely presses the start button 32. As aforementioned, the start button 32 has a pair of indexing lugs 116 which engage the cam projections 118 to index the escape wheel 64 one angular setting. For any number of copies desired that is greater than one, the operator can turn the knob 54 to set the desired number as indicated on the number dial 56. In the particular embodiment described above, the maximum number of copies that can be made at any one time is 15. The wheel is prevented from being displaced beyond the 15th setting by the back side of the cam projection 118, which, at the extreme or 15th setting, will abut against the single copy positioning lug 116 to prevent the further rotation of the knob 54 past the 15th setting.

In operation, the countdown mechanism 22 works as follows: For a single copy the start button 32 is depressed thereby forcing the counter knob 54 to its first position past the null setting where the pallet 94 of anchor 88 will loosely hold escape wheel 64 in place. The finger 110 of start button 32 depresses the switch arm 112 of start switch 114 thereby causing the machine to initiate a copy cycle. The carriage 24 proceeds through a reciprocating cycle and, on return, the trip actuator 34 engages the trip lever 36 thereby actuating the anchor 88 to return the counter knob 54 to its null setting. The action of the pallet 92 on the escape wheel 64 also forces the counter catch lug 86 underneath the tab 130. The catch release lug 74 carried on the ring 70 of knob 54 engages the latch release tab 126 to move the start switch latch 120 out of interferring relationship with the switch arm 112. Switch arm 112 transfers to its off position, thereby, turning the machine 20 off.

For a multi-copy operation the counter knob 54 is turned to the desired number of copies indicated by the numbers 63 on the number dial disc member 56. The latter action activates the multi-copy switch 134. The start switch latch 120 is released and falls against the switch arm 112. When start button 32 is depressed, its finger 110 forces the flexible switch arm 112 behind the lobe 128 of the latch 120 thereby initiating the continuous activity of the copy machine 20. The carriage 24 proceeds through its cycles and on each return engages the trip lever 36 thereby forcing the anchor 88 to return the escape wheel 64 one setting at a time toward the null setting whereupon the machine shuts off as with a single copy.

For operator convenience, the angle between the teeth 66 of escape wheel 64 is 100°, and the angle on the pallets 92,94 is 90°. The 10 degree difference between the indents 68 and the pallets 92,94 enables the operator to easily turn the counter knob 54 in either direction.

What is claimed is:

1. In a controlled, cyclically operable machine having a control circuit, a countdown control mechanism for operating said machine for a selected number of cycles, comprising in combination:

a. a start switch transferable between first and second positions, normally biased toward said second position and electrically connected to the control circuit for (1) continuously operating the machine when said start switch is in said first position and (2) for stopping said machine when said start which is in said second position, b. means for transferring said start switch from said second position to said first position in order to start the operation of said machine, c. a releasable latch for maintaining said start switch in said first position to thereby continuously operate said machine, d. an escape wheel having a plurality of angular settings including a null setting and turnable to any one of said plurality of settings each of which corresponds to a different selected number of cycles of operation of said machine, e. a latch release operable by said escape wheel when said wheel is in said null position for releasing said start switch latch, and f. an anchor having a pair of pallets alternately operable on said escape wheel for incrementally returning said escape wheel in angular setting increments toward said escape wheel null setting, and g. means for operating said anchor once during each cycle of operation of said machine, whereby the escape wheel is incrementally returned toward said null setting until the selected number of machine cycles is complete whereupon the start switch latch is released and the start switch transfers to its second position and the machine stops.

2. The invention of claim 1 further comprising an escape wheel catch including a first member fixedly mounted on said machine, and a second movable member biased toward said first member and mounted on said escape wheel to abut against said first member when said escape wheel is angularly displaced one setting from said null setting whereby said escape wheel is not manually resettable to said null position.

3. The invention of claim 2 wherein said second movable member is mounted on said escape wheel for radial alignment with one of said anchor pallets when said escape wheel is one angular setting displaced from said null setting.

4. A control panel adapted to be mounted on the side of a copier housing for selecting the number of copies to be made by the copier, the combination comprising:

a chassis having an opening therein; means for securing said chassis to the copier housing;

a longitudinally extending post secured to said chassis and having a central opening aligned with said chassis opening;

a knob rotatably disposed upon said post and having a disc member with a central opening for receiving the post, a sleeve portion extending perpendicular to said disc member from one side thereof, an escape wheel secured to the other side of said disc member, said escape wheel having a plurality of teeth about the perimeter thereof, and a release lug secured to said escape wheel;

said knob having a null setting;

an anchor pivotably mounted on said chassis, said anchor having a pallet which is engageable with the teeth of said escape wheel upon pivoting on said anchor;

a trip follower pivotably mounted on said chassis and mounted to pivotably engage said anchor;

a trip actuator supported by the copier and actuated with each copy cycle, said trip actuator being engageable with said trip follower upon the making of a copy by the copier whereby said trip follower upon being engaged by said trip actuator will be pivoted to engage and pivot said anchor whereupon said pallet will act upon one of said teeth to pivotably rotate said knob toward said null setting;

a start switch secured to said chassis and having an arm extending therefrom over said opening of said chassis, said start switch being enabled when said arm is in a first, depressed position;

a cam latch pivotably mounted on said chassis and biased to engage and depress said arm, said release lug being operative to engage said cam latch to overcome said cam latch bias and pivot said cam latch out of engagement with said start switch arm when said knob is in its null position;

means for biasing said arm into a second, blocking position with said latch after said latch has been pivoted by said release lug, said switch being disabled when said switch arm is in said second position; and a start button mounted on said post and received within said sleeve portion, said start button having a finger portion that extends through said chassis opening to engage said start switch arm to remove said arm from said blocking position with said cam latch and into said first position upon said start button being depressed into said sleeve.

5. The control panel of claim 4 wherein said teeth of said escape wheel each has an apex that forms an angle of 100° and the pallet of said anchor forms an apex with an angle of 90°.

6. The control panel of claim 4 including a fixed tab secured to said chassis and a catch lug supported upon said escape wheel, said fixed tab being engageable by said catch lug portion to prevent the rotation of said knob into said null setting before operation of a copy cycle is completed.

7. The control panel of claim 6 including biasing means between said post and said start button to bias said start button from said depressed position in said knob.

8. A control panel adapted to be mounted on the side of a copier housing for selecting the number of copies to be made by the copier, the combination comprising:

a chassis having a post with an opening therein;

means for securing said chassis to the copier housing;

a knob rotatably disposed upon said post having a disc member with a central opening for receiving the post, a sleeve portion extending perpendicular to said disc member from one side thereof, an escape wheel secured to the other side of said disc member, said escape wheel having a plurality of teeth about the perimeter thereof, a discontinuous release ring secured to the escape wheel and having an eccentric interior wall and a release lug secured to the perimeter of said discontinuous ring;

said knob having a null setting;

an annular band received within said release ring and having an anti-reset lug extending through the discontinuous portion of said release ring;

a tab secured to said chassis and engageable by said anti-reset lug;

an anchor pivotably mounted on said chassis, said anchor having a pair of pallets which are alternately engageable with said escape wheel upon pivoting of said anchor;

biasing means for urging a first of said pair of pallets into engagement with said escape wheel;

a trip lever operative to be pivoted and returned to its original position with each copying cycle of the copier;

a trip follower engaged by said trip lever and engageable with said anchor to pivot said anchor upon a copying cycle of the copier whereby said anchor upon being pivoted will have the second of said pallets engage one of said teeth to incrementally rotate said knob and upon disengagement of said anchor by said trip follower said anchor biasing means will urge said first pallet into engagement with another tooth to complete a partial rotation of said knob toward said null setting;

a start switch secured to said chassis and having an arm extending therefrom, said arm switch being enabled when said arm is in a first depressed position;

means for urging said arm into a second position, said switch being disabled when said switch arm is in said second position;

a cam pivotably mounted on said chassis and having biasing means to engage and depress said start switch arm, said release lug being operative to engage said cam latch to overcome said cam latch biasing means to pivot said cam latch out of engagement with said start switch arm and allowing said switch urging means to urge said arm into said second position thereby blocking said latch after said latch has been pivoted by said release lug; and a start button received within said sleeve portion and mounted on said post, said start button having a finger portion that extends through said chassis opening to engage said start switch arm upon the movement of said start button into said sleeve to remove said arm from said blocking position with said latch and into said first position upon said start button being moved into said sleeve.

9. The control panel of claim 8 wherein said teeth of said escape wheel each has an apex that forms an angle of 100° and said first pallet of said anchor forms an apex having an angle of 90°.

10. The control panel of claim 8 including means for rotating said knob away from said null position upon the movement of said start button into said sleeve.

11. The control panel of claim 8 including a biasing means disposed between said start button and said chassis for urging said start button away from said chassis.

12. The control panel of claim 11 wherein said annular band is biased to urge said anti-reset lug beyond said discontinuous opening and said second of said pallets will engage said anti-reset lug to overcome said annular band biasing means to move said anti-reset lug into said discontinuous portion when said knob assumes said null position.

13. The control panel of claim 11 wherein said means for rotating said knob upon the movement of said button includes at least one lug extending from said button toward said escape wheel and at least one cam projection secured to said escape wheel and extending toward said start button, said lug and said projection being engagingly aligned when said knob is in said null setting.

14. A control panel adapted to be mounted on the side of a copier housing for selecting the number of copies to be made by the copier, the combination comprising:

a chassis having an opening therein;

means for securing said chassis to the copier housing;

a knob rotatably disposed upon said chassis and having a disc member with a central opening and a sleeve portion attached to and extending normal to one side of said disc member;

said knob having a null position;

an escape wheel secured to the other side of said disc member, said escape wheel having a plurality of teeth about the perimeter thereof;

a release ring secured to the escape wheel with an opening therein;

a release lug secured to the perimeter of said release ring;

said knob having a null setting;

an annular catch band slidably received within said release ring and having a catch lug that is received through said release ring opening;

biasing means for urging said catch lug beyond the perimeter of said release ring;

a tab mounted on said chassis at a location spaced from said release ring opening when said knob is in its null position;

said catch lug being engageable with said tab when said catch lug is urged through said release ring opening by said catch lug biasing means;

an anchor pivotably mounted on said chassis, said anchor having a pair of pallets which are alternately drivingly engageable with said escape wheel teeth upon pivoting of said anchor;

biasing means for urging a first of said pair of pallets into engagement with said escape wheel;

a trip lever pivotably mounted on said chassis;

means for pivoting said trip lever in a first direction with each copying cycle of the copier;

biasing means for pivoting said trip lever in the opposite direction to a rest position upon completion of a copy cycle;

a trip follower pivotably mounted on said chassis and urged in engagement with said trip lever to be pivoted thereby, said trip follower being engageable with said anchor to pivot said anchor upon the pivoting of said trip lever whereby said anchor upon said trip lever being pivoted by said trip lever pivoting means will have the second of said pallets engage one of said teeth to incrementally rotate said knob and said trip lever upon being pivoted by said trip lever biasing means causes said trip follower to be disengaged from said anchor whereupon said anchor biasing means urges said first pallet into engagement with another tooth to complete a partial rotation of said knob toward said null setting;

said second pallet and said catch lug being located so that said catch lug is engaged by said second pallet to drive said catch lug into said release ring opening when said knob is assuming said null position whereby said catch lug will be out of an engaging position with said tab;

a start switch secured to said chassis and having an arm extending therefrom, said arm switch being enabled when said arm is in a first position and disabled when said arm is in a second position, said switch arm being biased toward said second position;

means for providing electrical connection between said start switch and the copier;

a cam latch pivotably mounted on said chassis and having biasing means to urge said cam latch into engagement with said start switch arm to drive said arm into said first position, said release lug being positioned to engage said cam latch when said knob is in said null position to overcome said cam latch biasing means and pivot said cam latch out of engagement with said start switch arm whereupon said start switch arm will assume its second position to disable said start switch; and a start button received within said sleeve portion, said start button having a finger portion that extends through said chassis opening to engage said start switch arm to drive said arm into said first position.

15. The control panel of claim 14 wherein said teeth of said escape wheel each has an apex that forms an angle of 100° and said first pallet of said anchor forms an apex at an angle of 90°.

16. A control panel adapted to be mounted on the side of a copier which has a carriage that reciprocates during the making of a copy, the control panel provided for selecting the number of copies to be made by the copier, the combination comprising:

a chassis;

means for securing said chassis to the copier;

a knob rotatably disposed upon said chassis and having a disc member and a sleeve portion which is attached to and extends normal to one side of said disc member;

said knob having a null position;

an escape wheel secured to the other side of said disc member, said escape wheel having a plurality of circumferentially spaced teeth;

an anchor pivotably mounted on said chassis, said anchor having a pair of pallets which are alternately engageable with said teeth upon pivoting of said anchor;

biasing means for urging a first of said pair of pallets into engagement with said teeth of said escape wheel;

linkage means mounted on said chassis and engageable by the reciprocating carriage for pivoting said anchor upon the reciprocating of said carriage to drive the second of said pallets into engagement with one of said teeth to incrementally rotate said knob and upon disengagement of said linkage means with said carriage said anchor biasing means urges said first pallet into driving engagement with another tooth to complete a partial rotation of said knob toward said null position;

a start switch operative when enabled to actuate the reciprecating carriage;

means for keeping said start switch disabled when said knob is in said null position; and means for enabling said start switch when said knob is in a position other than said null position.

17. A control panel adapted to be mounted on the side of a copier housing for selecting the number of copies to be made by the copier, the combination comprising:

a knob rotatably disposed upon the copier and having a disc member and a sleeve portion which is attached to and extends normal to one side of said disc member;

said knob having a null setting;

an escape wheel secured to the other side of said disc member, said escape wheel having a plurality of circumferentially spaced teeth;

an anchor pivotably mounted on said chassis, said anchor having a pair of pallets which are alternately engageable with said teeth upon pivoting of said anchor;

biasing means for urging a first of said pair of pallets into engagement with said escape wheel;

likage means providing engagement between the copier and anchor for pivoting said anchor with each copying cycle of the copier whereby said anchor upon being pivoted by said linkage means will have the second of said pallets engage one of said teeth to incrementally rotate said knob toward said null setting and when said linkage means disengages from said anchor said biasing means urges said first pallet into engagement with another tooth to complete a partial rotation of said knob toward said null setting;

a start switch operative to be actuated when said knob is in a position other than said null position; and means for disabling said start switch when said knob is in said null setting.

18. The control panel of claim 17 wherein said start switch includes a start button that is received within said knob and has a finger engageable with said start switch when said button is pushed into said knob.

* * * * *

UNITED STATES PATENT AND TRADEMARK OFFICE
CERTIFICATE OF CORRECTION

PATENT NO. : 4,229,096

DATED : October 21, 1980

INVENTOR(S) : David P. Bujese and George P. Rahgo

It is certified that error appears in the above-identified patent and that said Letters Patent are hereby corrected as shown below:

Column 3, line 8, change "occurance" to -- occurrence --.

Column 3, line 45, change "is" to -- in --.

Column 4, line 34, change "contast" to -- contrast --.

Column 6, line 19, change "interferring" to -- interfering --.

Column 6, line 37, change "interferring" to -- interfering --.

Column 6, line 57, change "he" to -- the --.

Column 6, line 66, change "these" to -- there --.

Column 7, line 33, change "interferring" to -- interfering --.

Column 7, line 36, change "interferring" to -- interfering --.

Column 7, line 37, change "interferring" to -- interfering --.

Column 7, line 44, change "interferring" to -- interfering --.

Column 7, line 56, change "interferring" to -- interfering --.

Column 7, line 54, change "acordance" to -- accordance --.

Column 10, line 12, change "on" to -- of --.

UNITED STATES PATENT AND TRADEMARK OFFICE
CERTIFICATE OF CORRECTION

PATENT NO. : 4,229,096

DATED : October 21, 1980

INVENTOR(S) : David P. Bujese and George P. Rahgo

It is certified that error appears in the above-identified patent and that said Letters Patent are hereby corrected as shown below:

Column 11, line 39, insert -- latch -- after "cam."

Column 14, line 12, change "reciprecating" to -- reciprocating -

Column 14, line 34, change "liage" to --linkage --.

Signed and Sealed this

***Eleventh* Day of *May 1982***

|SEAL|

*Attest:*

GERALD J. MOSSINGHOFF

*Attesting Officer* *Commissioner of Patents and Trademarks*